US011760358B2

(12) United States Patent
Hawley

(10) Patent No.: US 11,760,358 B2
(45) Date of Patent: Sep. 19, 2023

(54) SOUND BASED POWERTRAIN CONTROL SYSTEM

(71) Applicant: Toyota Motor Engineering & Manufacturing North America, Inc., Plano, TX (US)

(72) Inventor: Thomas S. Hawley, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 231 days.

(21) Appl. No.: 17/224,994

(22) Filed: Apr. 7, 2021

(65) Prior Publication Data

US 2022/0324456 A1 Oct. 13, 2022

(51) Int. Cl.
*B60W 40/08* (2012.01)
*B60W 10/06* (2006.01)
*B60W 10/08* (2006.01)
*B60W 10/10* (2012.01)
*B60W 30/184* (2012.01)

(52) U.S. Cl.
CPC ............ *B60W 40/08* (2013.01); *B60W 10/06* (2013.01); *B60W 10/08* (2013.01); *B60W 10/10* (2013.01); *B60W 30/184* (2013.01); *B60W 2420/54* (2013.01); *B60W 2510/104* (2013.01); *B60W 2510/105* (2013.01); *B60W 2540/10* (2013.01)

(58) Field of Classification Search
CPC ...... B60W 40/08; B60W 10/06; B60W 10/08; B60W 10/10; B60W 30/184; B60W 2420/54; B60W 2510/104; B60W 2510/105; B60W 2540/10
See application file for complete search history.

(56) References Cited

U.S. PATENT DOCUMENTS

| | | | |
|---|---|---|---|
| 5,493,616 A | 2/1996 | Iidaka et al. | |
| 9,296,386 B2 | 3/2016 | Kobayashi et al. | |
| 9,512,794 B2 | 12/2016 | Serrano et al. | |
| 10,060,368 B2 | 8/2018 | Pirjaberi et al. | |
| 2008/0191568 A1 | 8/2008 | Kobayashi et al. | |
| 2014/0302964 A1* | 10/2014 | Kobayashi | B60W 10/08 180/65.265 |
| 2018/0328292 A1 | 11/2018 | Srinivasan et al. | |
| 2019/0308640 A1* | 10/2019 | Miller | B60W 30/182 |
| 2020/0070829 A1 | 3/2020 | Martinez et al. | |

FOREIGN PATENT DOCUMENTS

JP 2009107600 A 5/2009

* cited by examiner

*Primary Examiner* — Grant Moubry
*Assistant Examiner* — Ruben Picon-Feliciano
(74) *Attorney, Agent, or Firm* — SNELL & WILMER LLP

(57) ABSTRACT

Methods, systems, and apparatus for controlling operation of a vehicle. The system includes a microphone located in a passenger cabin of the vehicle and configured to detect sound data indicating noise in the passenger cabin. The system also includes a powertrain of the vehicle including an engine/motor for propelling the vehicle and a transmission of the vehicle having a plurality of gears. The system also includes an electronic control unit (ECU) of the vehicle coupled to the microphone and the transmission. The ECU is configured to determine a powertrain torque limit based on the sound data, determine whether a torque output of the powertrain exceeds the powertrain torque limit, and instruct the transmission to downshift when the torque output of the powertrain exceeds the powertrain torque limit.

20 Claims, 10 Drawing Sheets

SOUND BASED POWERTRAIN CONTROL SYSTEM

BACKGROUND

1. Field

This specification relates to a system and a method for adjusting operations of a powertrain of a vehicle.

2. Description of the Related Art

A vehicle may transport occupants or cargo from one place to another. Vehicles operate using a powertrain to drive axles of the vehicle, which turns wheels of the vehicle. The powertrain may include an electric motor or an engine and a transmission with multiple gears. The vehicle may automatically control which gear to use, or the driver of the vehicle may manually shift between gears. However, depending on the gear and the powertrain speed, the powertrain may generate noise which may be audible from inside of the vehicle passenger cabin. Loud noise may be unpleasant for the occupants of the vehicle to hear. Thus, there is a need for improved vehicles and vehicle systems to reduce noise in the passenger cabin.

SUMMARY

What is described is a system for controlling operations of a vehicle. The system includes a microphone located in a passenger cabin of the vehicle and configured to detect sound data indicating noise in the passenger cabin. The system also includes a powertrain of the vehicle including an engine/motor for propelling the vehicle and a transmission of the vehicle having a plurality of gears. The system also includes an electronic control unit (ECU) of the vehicle coupled to the microphone and the transmission. The ECU is configured to determine a powertrain torque limit based on the sound data, determine whether a torque output of the powertrain exceeds the powertrain torque limit, and instruct the transmission to downshift when the torque output of the powertrain exceeds the powertrain torque limit.

Also described is a method for controlling operations of a vehicle. The method includes detecting, by a microphone located in a passenger cabin of the vehicle, sound data indicating noise in the passenger cabin. The method also includes determining, by an electronic control unit (ECU) of the vehicle, a powertrain torque limit based on the sound data. The method also includes determining, by the ECU, whether a torque output of the powertrain exceeds the powertrain torque limit. The method also includes downshifting, by a transmission of the vehicle, when the torque output of the powertrain exceeds the powertrain torque limit.

Also described is a vehicle. The vehicle includes a microphone located in a passenger cabin and configured to detect sound data indicating noise in the passenger cabin. The vehicle also includes a powertrain including an engine/motor for propelling the vehicle and a transmission having a plurality of gears. The vehicle also includes an electronic control unit (ECU) coupled to the microphone and the transmission. The ECU is configured to determine a powertrain torque limit based on the sound data, determine whether a torque output of the powertrain exceeds the powertrain torque limit, and instruct the transmission to downshift when the torque output of the powertrain exceeds the powertrain torque limit.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, vehicles, and methods for controlling operation of a vehicle based on detected sound within the passenger cabin. The systems, vehicles, and methods disclosed herein automatically detect the sound within a passenger cabin using one or more microphones and automatically adjust gear shifting points and torque output limits based on the detected level of sound.

A vehicle may carry large amounts of cargo or may traverse an inclined road. In these situations, the vehicle may utilize more torque output from its powertrain. However, in some situations, as a result of the increased torque demand, significant noise may be emitted from the powertrain. This noise may be undesirable for the occupants within the passenger cabin of the vehicle. In order to reduce this noise, the electronic control unit (ECU) of the vehicle may limit torque output by the powertrain by instructing the transmission to use a lower gear.

The noise considerations may generally fall under a classification of NVH (noise, vibration, and harshness) considerations for occupant comfort. Various adjustments may be made to the operation of the vehicle to reduce the NVH experienced by the occupants, including limiting torque output. However, by limiting torque output, the overall performance of the vehicle may suffer. The driver of the vehicle may not experience the same acceleration responsiveness, which may be disappointing or unsatisfying to the driver.

The systems and methods described herein selectively and automatically expand use of the torque from the powertrain based on detected noise levels within the passenger cabin. When there is more noise in the passenger cabin, the vehicle is able to provide more torque output while not disturbing the occupants of the vehicle because the noise generated from the powertrain is less noticeable due to the noise within the passenger cabin. Thus, the systems and methods described herein allow for increased performance of the vehicle while not negatively impacting the experience of the occupants of the vehicle.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

Figure 1:
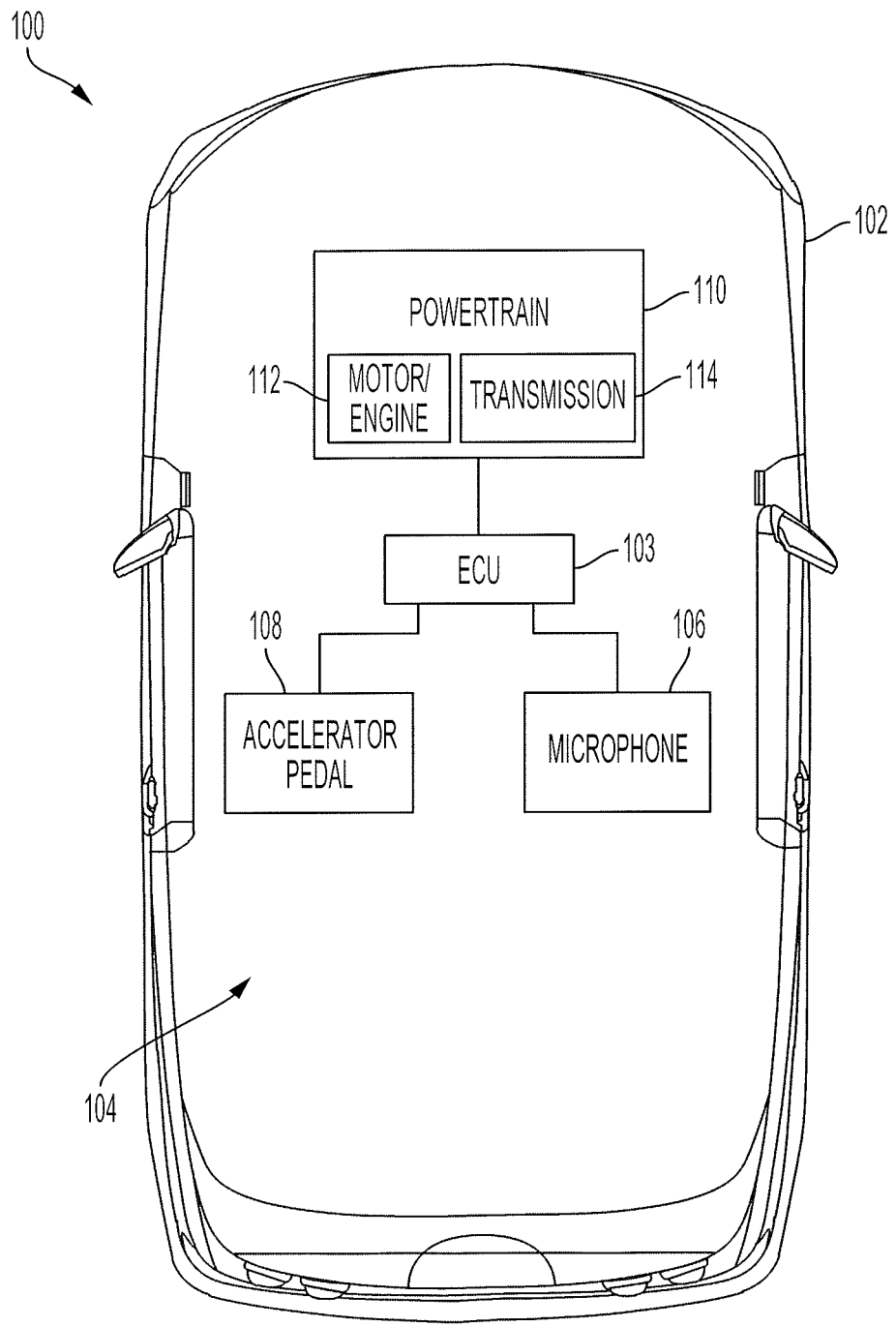
FIG. 1 illustrates a vehicle, according to various embodiments of the invention.

FIG. 1 illustrates a system 100 including a vehicle 102. The vehicle 102 includes a powertrain 110, an electronic control unit (ECU) 103, an accelerator pedal 108, and a microphone (or one or more microphones) 106.

The powertrain 110 is configured to use fuel (e.g., gasoline, hydrogen fuel, electricity) to generate torque to turn a drivetrain. The drivetrain translates the torque generated from the powertrain 110 to turn the wheels to propel the vehicle 102. The powertrain 110 includes a propulsion source, such as an engine and/or an electric motor 112. The powertrain 110 may also include a transmission 114 having a plurality of gears to use when translating the torque generated by the propulsion source into propelling the vehicle 102.

An electronic control unit (ECU) 103 communicatively coupled to the powertrain 110 controls shifting of gears during operation of the vehicle 102. For example, when the rotations per minute of an engine exceed a threshold, the ECU 103 may automatically instruct the transmission 114 to shift to a higher gear. By doing so, the engine may operate at a more fuel-efficient level.

The driver may engage an accelerator pedal 108, which causes an increase in the operating speed of the powertrain 110. The pedal input used to determine shifting of gears may be expressed as a percent engagement of the accelerator pedal 108, whereby when the accelerator pedal 108 is 0% engaged, the driver is not engaging the accelerator pedal 108 at all, and when the accelerator pedal 108 is 100% engaged, the driver completely engages the accelerator pedal 108. Whether the ECU 103 shifts the gear up or down may be based on a pedal input from the driver. For example, if the accelerator pedal 108 is 80% engaged and the powertrain speed exceeds a threshold, the ECU 103 may shift to a higher gear.

When the vehicle 102 has a relatively high weight load, such as when the vehicle 102 is pulling a trailer or is carrying cargo, or when the vehicle 102 is traversing an inclined road, the vehicle 102 may use more torque output from the powertrain 110. However, in some situations, as a result of the increased torque demand, significant noise may be emitted from the powertrain 110. This noise may be undesirable for the occupants within the passenger cabin 104 of the vehicle 102. In order to reduce this noise, the ECU 103 may limit torque output by the powertrain 110 by instructing the transmission 114 to use a lower gear.

The noise considerations may generally fall under a classification of NVH (noise, vibration, and harshness) considerations for occupant comfort. Various adjustments may be made to the operation of the vehicle 102 to reduce the NVH experienced by the occupants, including limiting torque output. However, by limiting torque output, the overall performance of the vehicle 102 may suffer. The driver of the vehicle 102 may not experience the same acceleration responsiveness, which may be disappointing or unsatisfying to the driver.

The systems and methods described herein use a microphone 106 within the passenger cabin 104 to monitor the interior noise. When the interior noise increases, the torque limit of the powertrain may also be increased, as the occupants of the vehicle 102 may not experience the powertrain noise due to the existing noise within the passenger cabin 104. The noise within the passenger cabin 104 may be due to an open window, music playing from speakers within the passenger cabin 104, or noise made by one or more occupants of the vehicle 102, for example. In this way, the vehicle 102 is able to provide more torque while maintaining the noise considerations for occupant comfort.

Figure 2:
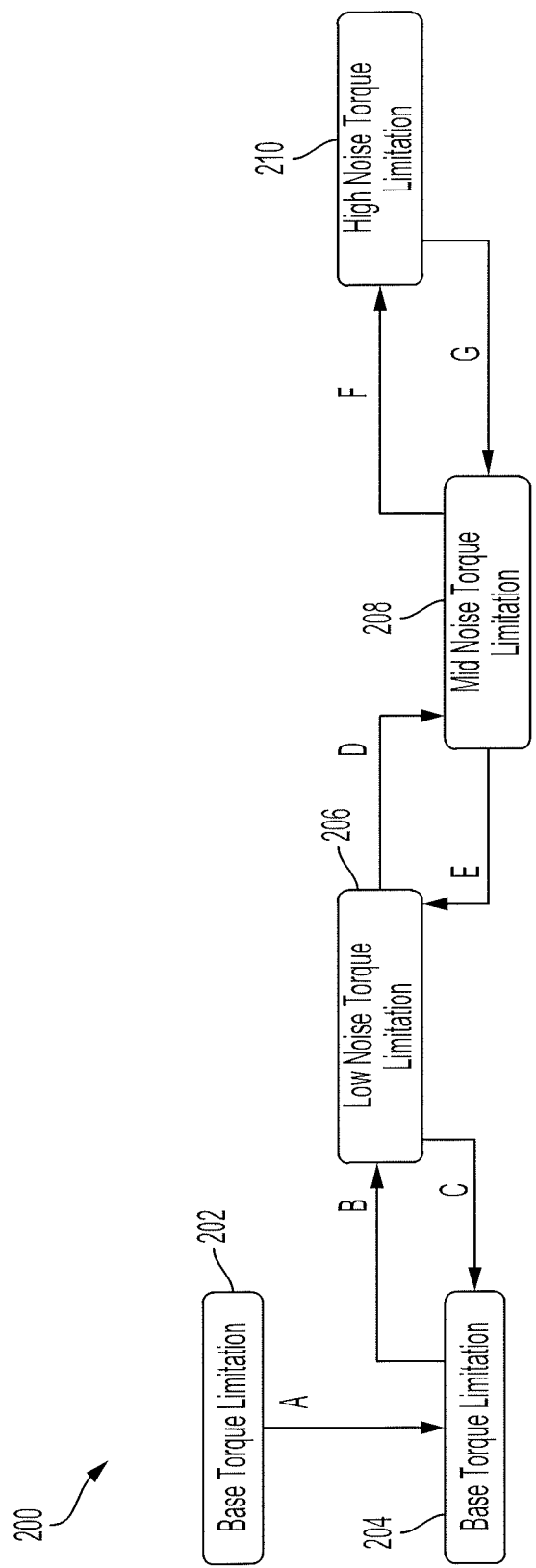
FIG. 2 illustrates a state machine for controlling a powertrain of the vehicle, according to various embodiments of the invention.

FIG. 2 illustrates a state machine (or state diagram) 200 for controlling operations of the powertrain 110. The state machine 200 may be implemented by one or more processors of the vehicle 102 (e.g., ECU 103). The state machine 200 may operate between four different states: a no-noise state 204, a low-noise state 206, a mid-noise state 208, and a high-noise state 210. Each of these states correspond to a respective torque limit of torque capable of being output by the powertrain 110.

Figure 3:
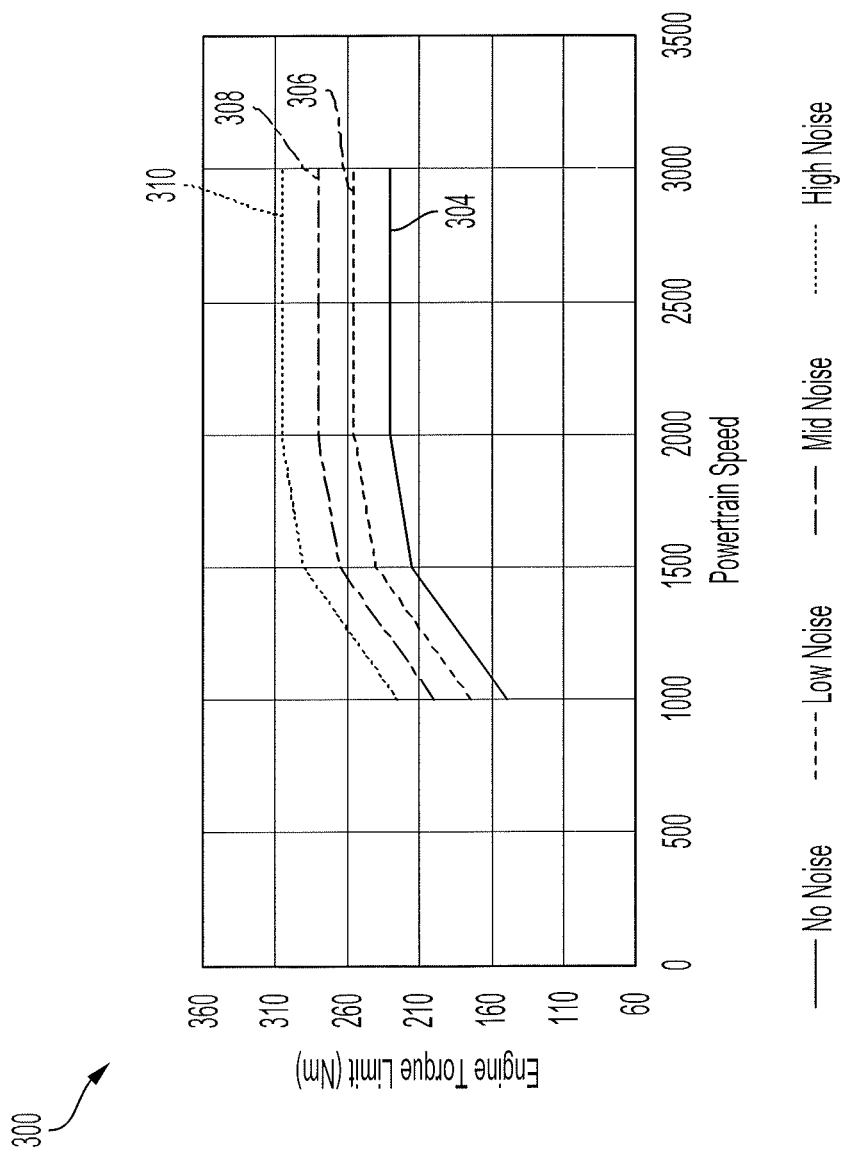
FIG. 3 illustrates varying engine torque use based on detected sound levels, according to various embodiments of the invention.

FIG. 3 illustrates a torque limit map 300 including curves that represent the respective torque limits. The torque limit map 300 of FIG. 3 has a horizontal axis of powertrain speed and a vertical axis of torque limit. As shown, the torque limit map 300 corresponds to an internal combustion engine and includes powertrain speed in units of revolutions per minute (RPM) and a torque limit in units of newton-meters. However, similar graphs may be used for other types of vehicles, such as electric vehicles and fuel cell vehicles.

As shown in FIG. 3, a no-noise curve 304 (or baseline curve or nominal curve) shows the available engine torque in the no-noise state, a low-noise curve 306 in the low-noise state 206, a mid-noise curve 308 in the mid-noise state 208, and a high-noise curve 310 in the high-noise state 210. The areas under the respective curves represent the torque available to the vehicle 102. As can be seen, the available torque at each state increases with the powertrain speed until a threshold (e.g., 2000 RPM), where the available torque remains constant (e.g., from 2000 RPM to 3000 RPM).

Returning to FIG. 2, the state machine 200 begins with an initial state 202 of a base torque limitation when the system is initialized (e.g., during turning on of the vehicle 102).

The state machine 200 then transitions (A) to a no-noise state 204, where the base torque limitation is used when there is no noise in the passenger cabin 104. The base torque limitation may be graphically represented in FIG. 3 by the no-noise curve 304. In some embodiments, "no noise" may refer to any noise level under a low-noise threshold, such as 80 decibels (dB). The noise level in the passenger cabin 104 may be detected by the microphone 106.

When the noise level in the passenger cabin 104 exceeds the low-noise threshold, the state machine 200 transitions (B) to a low-noise state 206, where a low-noise torque limitation is used instead of the base torque limitation. The noise level in the passenger cabin 104 may increase when, for example, music is turned on or the windows are opened. The low-noise torque limitation may be graphically represented in FIG. 3 by the low-noise curve 306. The low-noise curve 306 is above the no-noise curve 304, indicating that more powertrain torque is available at each powertrain speed, as compared to the no-noise curve 304. Thus, as the cabin noise increases, the available torque also increases. In some embodiments, "low noise" may refer to a noise level above the low-noise threshold, such as 80 dB, and below a mid-noise threshold, such as 85 dB.

When the noise level in the passenger cabin 104 falls below the low-noise threshold, the state machine 200 transitions (C) back to the no-noise state 204, where the base torque limitation is used instead of the low-noise torque limitation. The noise level in the passenger cabin 104 may decrease when, for example, music is turned off or the windows are closed. Again, the no-noise torque limitation may be graphically represented in FIG. 3 by the no-noise curve 304. The no-noise curve 304 is below the low-noise curve 306, indicating that less powertrain torque is available at each powertrain speed, as compared to the low-noise curve 306. Thus, as the cabin noise decreases, the available torque also decreases.

When the noise level in the passenger cabin 104 exceeds the mid-noise threshold, the state machine 200 transitions (D) from the low-noise state 206 to the mid-noise state 208, where a mid-noise torque limitation is used instead of the low-noise torque limitation. The mid-noise torque limitation may be graphically represented in FIG. 3 by the mid-noise curve 308. The mid-noise curve 308 is above the low-noise curve 306, indicating that more powertrain torque is available at each powertrain speed, as compared to the low-noise curve 306. In some embodiments, "mid noise" may refer to a noise level above the mid-noise threshold, such as 85 dB, and below a high-noise threshold, such as 90 dB.

When the noise level in the passenger cabin 104 falls below the mid-noise threshold, the state machine 200 transitions (E) back to the low-noise state 206, where the low-noise torque limitation is used instead of the mid-noise torque limitation. Again, the low-noise torque limitation may be graphically represented in FIG. 3 by the low-noise curve 306. The low-noise curve 306 is below the mid-noise curve 308, indicating that less powertrain torque is available at each powertrain speed, as compared to the mid-noise curve 308.

When the noise level in the passenger cabin 104 exceeds the high-noise threshold, the state machine 200 transitions (F) from the mid-noise state 208 to the high-noise state 210, where a high-noise torque limitation is used instead of the mid-noise torque limitation. The high-noise torque limitation may be graphically represented in FIG. 3 by the high-noise curve 310. The high-noise curve 310 is above the mid-noise curve 308, indicating that more powertrain torque is available at each powertrain speed, as compared to the mid-noise curve 308. In some embodiments, "high noise" may refer to a noise level above the high-noise threshold, such as 90 dB.

When the noise level in the passenger cabin 104 falls below the high-noise threshold, the state machine 200 transitions (G) back to the mid-noise state 208, where the mid-noise torque limitation is used instead of the high-noise torque limitation. Again, the mid-noise torque limitation may be graphically represented in FIG. 3 by the mid-noise curve 308. The mid-noise curve 308 is below the high-noise curve 310, indicating that less powertrain torque is available at each powertrain speed, as compared to the high-noise curve 310.

In some situations, a vehicle may fluctuate between states in a relatively short period of time. For example, the detected noise level in the passenger cabin may fluctuate between 84 and 86 dB, depending on the noise of the environment outside the vehicle 102. These fluctuations may happen within a short period of time (e.g., 1 second, 2 seconds, 5 seconds, 10 seconds, 20 seconds, 30 seconds). However, it may not be beneficial for the vehicle 102 to rapidly change between the low-noise state 206 and the high-noise state 210, particularly if the vehicle 102 is being operated near the torque limit. Switching between the two states when the vehicle 102 is being operated near the torque limit may result in a choppy ride, as the driver may go back and forth between a feeling of lack of responsiveness of the accelerator pedal and immediate responsiveness. In an example situation, the accelerator pedal may be engaged at a same level, but the vehicle 102 may go back and forth between acceleration and deceleration based on the noise within the passenger cabin 104 of the vehicle 102.

In order to make the experience smoother for the driver and/or the occupants, a timer may be activated when a state is changed, and the state may be held until the timer expires. That is, there may be a minimum threshold amount of time within each of the states before transitioning to another state. The minimum threshold amount of time may be 5 seconds, 10 seconds, 30 seconds, 1 minute, or 2 minutes, for example.

Thus, the state machine 200 may transition (B) to a low-noise state 206 from the no-noise state 204 when the noise level in the passenger cabin 104 exceeds the low-noise threshold and after the minimum threshold amount of time has elapsed while being in the no-noise state 204.

The state machine 200 may transition (C) back to the no-noise state 204 when the noise level in the passenger cabin 104 falls below the low-noise threshold and after the minimum threshold amount of time has elapsed while being in the low-noise state 206.

The state machine 200 may transition (D) from the low-noise state 206 to the mid-noise state 208 when the noise level in the passenger cabin 104 exceeds the mid-noise threshold and after the minimum threshold amount of time has elapsed while being in the low-noise state 206.

The state machine 200 may transition (E) back to the low-noise state 206 when the noise level in the passenger cabin 104 falls below the mid-noise threshold and after the minimum threshold amount of time has elapsed while being in the mid-noise state 208.

The state machine 200 may transition (F) from the mid-noise state 208 to the high-noise state 210, when the noise level in the passenger cabin 104 exceeds the high-noise threshold and after the minimum threshold amount of time has elapsed while being in the mid-noise state 208.

The state machine 200 may transition (G) back to the mid-noise state 208 when the noise level in the passenger cabin 104 falls below the high-noise threshold and after the minimum threshold amount of time has elapsed while being in the high-noise state 210.

In some embodiments, the same minimum threshold amount of time is used for each state. In other embodiments, a different minimum threshold amount of time is used for each state.

In some embodiments, the noise detected from the passenger cabin 104 is determined based on a moving average to avoid sudden changes due to a momentary event, such as a honking of a horn, a rolling down of windows, or a sneeze by an occupant, for example. The duration of the moving average may be between 10 seconds and 30 seconds, for example.

While FIG. 2 has four states (a no-noise state 204, a low-noise state 206, a mid-noise state 208, and a high-noise state 210) corresponding to four torque limit curves (a no-noise curve 304, a low-noise curve 306, a mid-noise curve 308, and a high-noise curve 310), more states and curves or fewer states and curves may be utilized. For example, in some embodiments, there may be three states and three corresponding curves, and in other embodiments, there may be five states and five corresponding curves.

Figure 4:
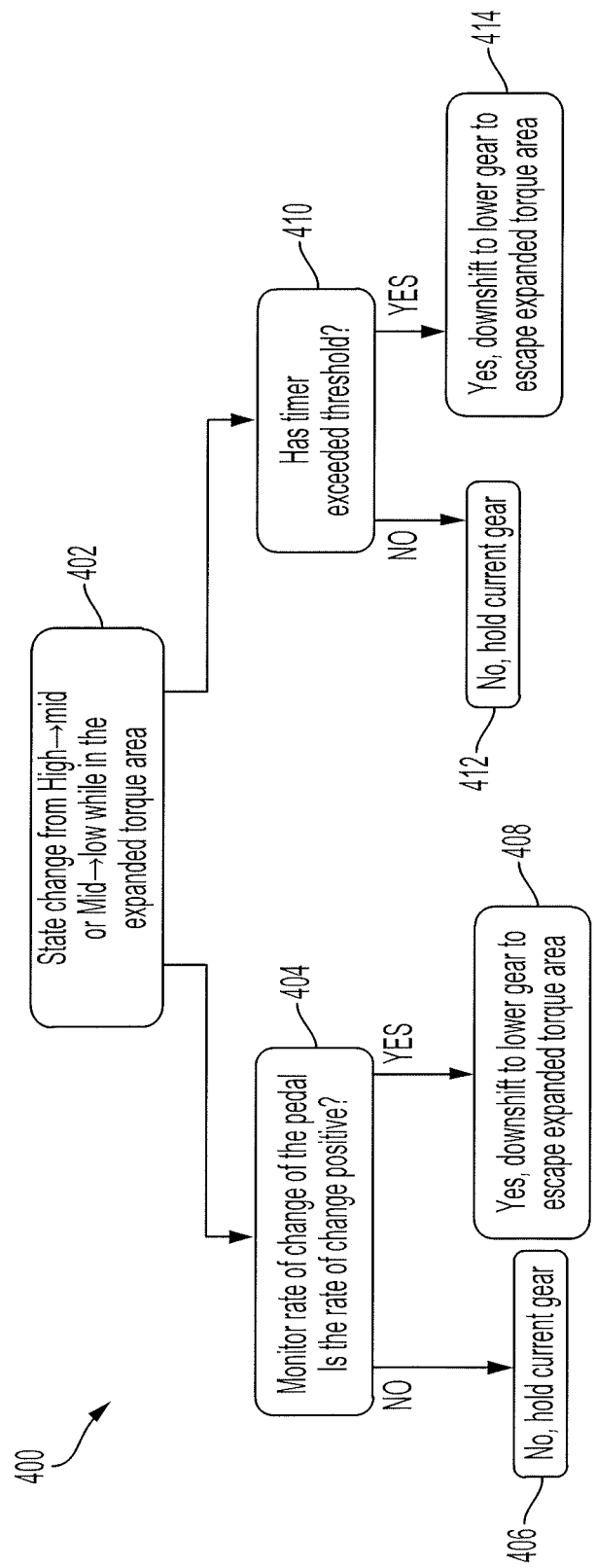
FIG. 4 illustrates a process for controlling the powertrain of the vehicle, according to various embodiments of the invention.

FIG. 4 illustrates a flow diagram of a process 400 for situations where the vehicle 102 is operating in an expanded region (e.g., regions above the no-noise curve 304) but a noise level inside the vehicle 102 is reduced, and the vehicle 102 should no longer operate in the expanded region. An abrupt downshifting of gears may be uncomfortable or unexpected for the driver and/or occupants of the vehicle 102. Accordingly, various measures may be taken, as described in FIG. 4.

The state may change from a first state associated with a higher noise level to a second state associated with a lower noise level (step 402). For example, the state may change from a high-noise state 210 to a mid-noise state 208 (transition G in FIG. 2), from a mid-noise state 208 to a low-noise state 206 (transition E in FIG. 2), or a low-noise state 206 to a no-noise state 204 (transition C in FIG. 2).

A rate of change of the accelerator pedal may be detected following the state change in step 402, and the ECU 103 may determine whether the rate of change of the accelerator pedal is positive (step 404). That is, a positive rate of change of the accelerator pedal is an increase in the engagement of the accelerator pedal by the driver.

If the rate of change of the accelerator pedal is not positive (i.e., if the pedal is held in the same engagement level or if the pedal is disengaged), then the current gear is held (step 406). That is, the transmission does not change gears.

If the rate of change of the accelerator pedal is positive (i.e., if the pedal is further engaged or depressed), then a lower gear is used to move away from the expanded torque area (step 408). The ECU 103 may instruct the transmission of the powertrain 110 to move to a lower gear.

Simultaneously, after the state changes from a first state associated with a higher noise level to a second state associated with a lower noise level, as performed in step 402, the system (e.g., the ECU 103) begins a timer and then determines whether the timer has exceeded a time threshold (step 410).

If the timer has not exceeded the time threshold, then the current gear is maintained (step 412). That is, the transmission does not change gears.

However, if the timer exceeds the time threshold, then a lower gear is used to move away from the expanded torque area (step 414). The ECU 103 may instruct the transmission of the powertrain 110 to move to a lower gear. In this way, the time threshold may be considered a downshift time threshold, where the time threshold is met before a downshift is performed.

The time threshold used in step 410 may be determined based on a downshift timer map, which provides a time threshold based on a vehicle acceleration. For example, if the vehicle 102 is accelerating at a low rate, the time determined based on the downshift timer map may be a relatively low value (e.g., 5 seconds), whereas if the vehicle 102 was accelerating at a higher rate, the time determined from the downshift timer map may be a higher value (e.g., 20 seconds). Thus, the vehicle 102 has more time to stay in its current gear (in the expanded torque area) the more it accelerates. In this way, the downshift timer map is a one-dimensional map that receives an acceleration as an input and provides a time threshold as an output. By using the downshift timer map, the system may achieve a more dynamic response to determining when to downshift after the noise level is reduced. In other embodiments, a downshift timer map may not be used, and a static, predetermined downshift time threshold may be used.

Figure 5:
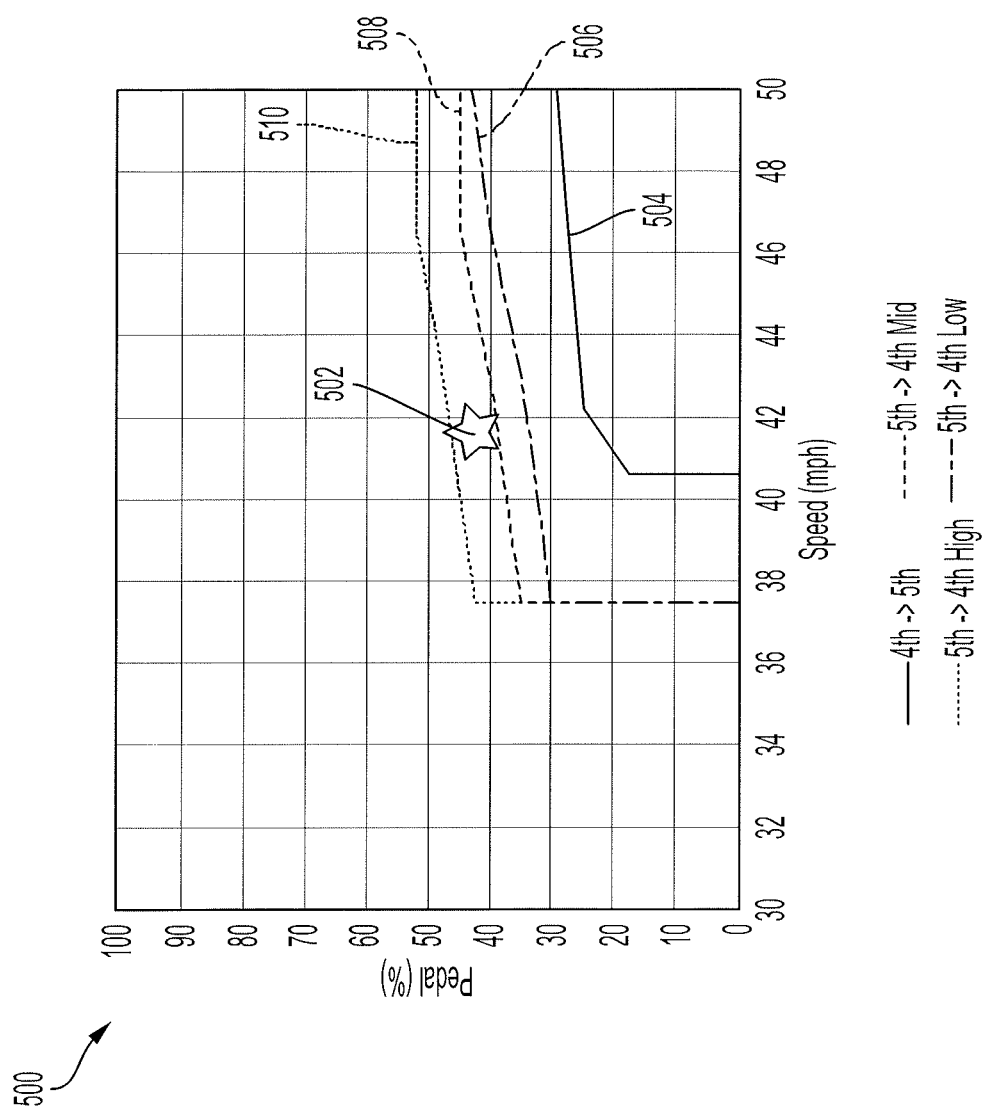
FIG. 5 illustrates an expanded downshift schedule, according to various embodiments of the invention.

FIG. 5 illustrates a downshift expansion shift schedule 500. The ECU 103 may instruct the transmission to downshift gears based on the shift schedule 500 based on the speed of the vehicle and the pedal engagement.

The first curve 503 is an upshift line. For example, if the accelerator pedal input remained steady at 10% engagement and the vehicle accelerated from 40 mph to 42 mph, the transmission will upshift from a lower gear to a higher gear.

When the system detects noise in the passenger cabin, the torque output limits are expanded, as described herein. The expanded torque output limits are reflected in the shift schedule 500 by the second curve 506 representing a low shift line associated with a low-noise state (e.g., low-noise state 206), the third curve 508 representing a mid shift line associated with a mid-noise state (e.g., mid-noise state 208), and a fourth curve 510 representing a high shift line associated with a high-noise state (e.g., high-noise state 210). When the vehicle operation crosses the second curve 506, the third curve 508, or the fourth curve 510, the transmission downshifts from a higher gear to a lower gear.

Thus, depending on the detected noise level in the passenger cabin, the vehicle 102 may remain in the current gear for a longer time before downshifting. For example, if the accelerator pedal input remained steady at 10% engagement and the vehicle accelerated from 40 mph to 42 mph, the transmission will upshift from a lower gear (e.g., 4th gear) to a higher gear (e.g., 5th gear). Then, if the vehicle speed remains steady at 42 mph, the vehicle 102 will remain in the 5th gear even as the accelerator pedal is further engaged, until one of the downshift lines (e.g., second curve 506, third curve 508, or fourth curve 510) is reached.

Continuing the example, if there is a low level of noise detected in the passenger cabin (e.g., low-noise state 206), as the accelerator pedal is further engaged (and assuming the vehicle speed remains at 42 mph), the transmission will downshift when the accelerator pedal engagement reaches 35%, as shown in the shift schedule 500.

Further continuing the example, if there is a mid level of noise detected in the passenger cabin (e.g., mid-noise state 208), as the accelerator pedal is further engaged (and assuming the vehicle speed remains at 42 mph), the transmission will downshift when the accelerator pedal engagement reaches 40%, as shown in the shift schedule 500.

Further continuing the example, if there is a high level of noise detected in the passenger cabin (e.g., high-noise state 210), as the accelerator pedal is further engaged (and assuming the vehicle speed remains at 42 mph), the transmission will downshift when the accelerator pedal engagement reaches 47%, as shown in the shift schedule 500.

FIG. 5 may be considered in conjunction with the process 400 of FIG. 4. For example, the vehicle may be travelling at 41 mph and the accelerator pedal engagement is 42%, as shown by icon 502, and the vehicle 102 may remain in the higher gear if the detected noise level in the vehicle 102 is a noise level corresponding to the fourth curve 510. If the noise level is reduced (e.g., windows closed or music turned off), the fourth curve 510 may no longer represent the downshift limit, and a lower curve (e.g., second curve 506 or third curve 508) may represent the downshift limit (step 402).

Instead of automatically downshifting in response to the reduced noise level, the process 400 considers the rate of change of accelerator pedal engagement in step 404 and/or whether a timer has exceeded a time threshold in step 410, and may hold the current gear in some situations, as described in the process 400.

Figure 6:
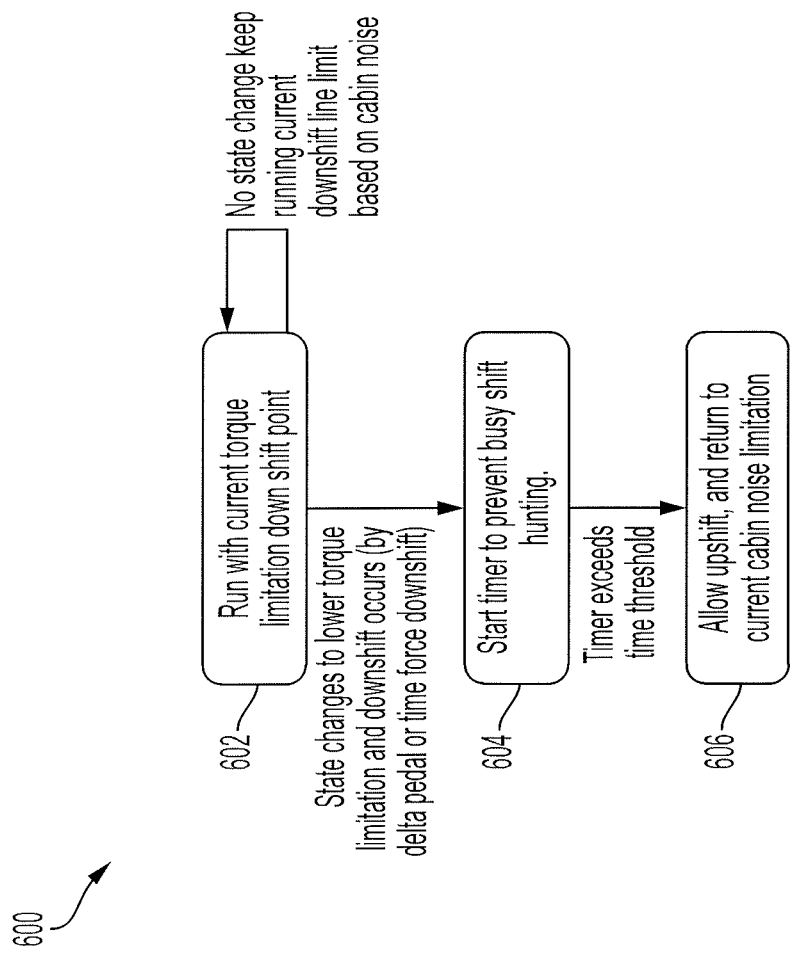
FIG. 6 illustrates a process for managing gear shifting, according to various embodiments of the invention.

FIG. 6 illustrates a process 600 for reducing occurrences of situations where the vehicle alternates between two gears based on fluctuations in noise within the passenger cabin of the vehicle.

The current torque limitation down shift points are used (step 602). The down shift points may be stored in a shift schedule (e.g., shift schedule 500) and the ECU 103 may use the shift schedule to determine when to instruct the transmission to downshift. When there is no state change caused by a change in detected noise within the passenger cabin, step 602 is maintained.

However, if there is a change in state caused by a change in detected noise within the passenger cabin to a lower state (corresponding to a lower torque output limit and lower downshift curve), the transmission downshifts to a lower gear. This may happen when the vehicle was operating in an area that it was previously allowed to operate in when the detected noise level was higher, but now that the detected noise level is reduced, the vehicle is no longer able to operate in the area.

Once the transmission downshifts, a timer is started (step 604). The timer is used to prevent a subsequent upshift within a close amount of time from the downshift. This close-in-time upshift is prevented because there is a possibility that the vehicle may again perform a subsequent downshift, and this rapid alternating between two gears is undesirable for the driver and the occupants.

The timer may be compared to a time threshold. This time threshold may be different than the time threshold used in the process 400 of FIG. 4 (i.e., the downshift time threshold).

If the timer exceeds the time threshold, then upshifting to a higher gear is permitted (according to an upshift shift schedule), and the current cabin noise limitation is used (step 606). In this way, the time threshold may be considered an upshift time threshold, where the time threshold is met before an upshift is performed.

The time threshold used in process 600 may be determined based on an upshift timer map, which provides a time threshold based on accelerator pedal engagement percentage and powertrain speed. For example, if the accelerator pedal was engaged by a relatively low amount and the powertrain speed is also relatively low, the time determined based on the upshift timer map may be a relatively low value (e.g., 5 seconds), whereas if the accelerator pedal was engaged by a higher amount and the powertrain speed is also higher, the time determined from the upshift timer map may be a higher value (e.g., 20 seconds). In this way, the upshift timer map is a two-dimensional map that receives a pedal engagement and a powertrain speed as an input and provides a time threshold as an output. By using the upshift timer map, the system may achieve a more dynamic response to determining when to upshift after the noise level is reduced. In other embodiments, an upshift timer map may not be used, and a static, predetermined upshift time threshold may be used.

It is important to note that while upshifting may be prevented before the timer exceeds the upshift time threshold, further downshifting may be permitted as dictated by the downshift shift schedule.

Figure 7:
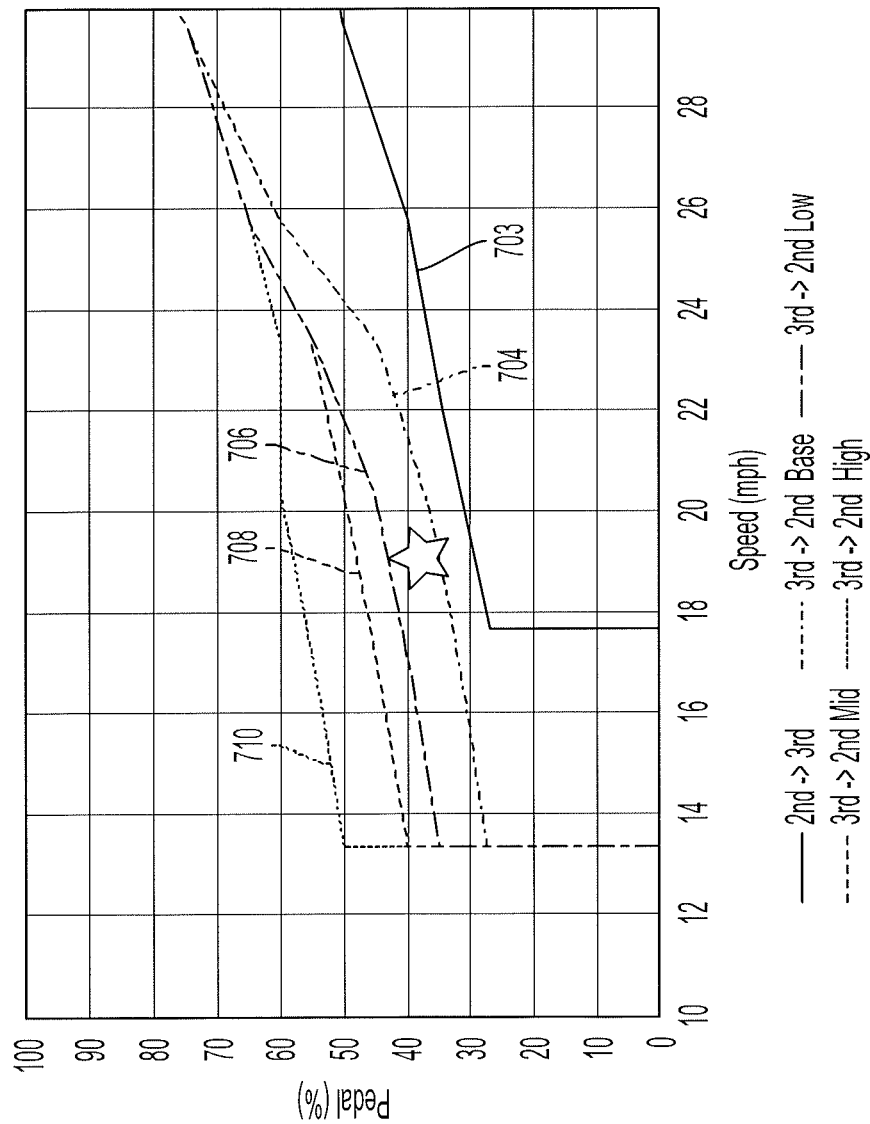
FIG. 7 illustrates an expanded downshift schedule, according to various embodiments of the invention.

FIG. 7 illustrates a downshift shift schedule 700 similar to downshift shift schedule 500. The downshift shift schedule 700 includes a first curve 703 corresponding to an upshift line, similar to curve 503.

The downshift shift schedule 700 also includes a second curve 706 (similar to second curve 506) representing a low shift line associated with a low-noise state (e.g., low-noise state 206), a third curve 708 (similar to third curve 508) representing a mid shift line associated with a mid-noise state (e.g., mid-noise state 208), and a fourth curve 710 (similar to fourth curve 510) representing a high shift line associated with a high-noise state (e.g., high-noise state 210). In addition to these curves, the downshift shift schedule 700 also includes a fifth curve 704 representing a base shift line associated with a no-noise state (e.g., no-noise state 204).

Figure 8A:
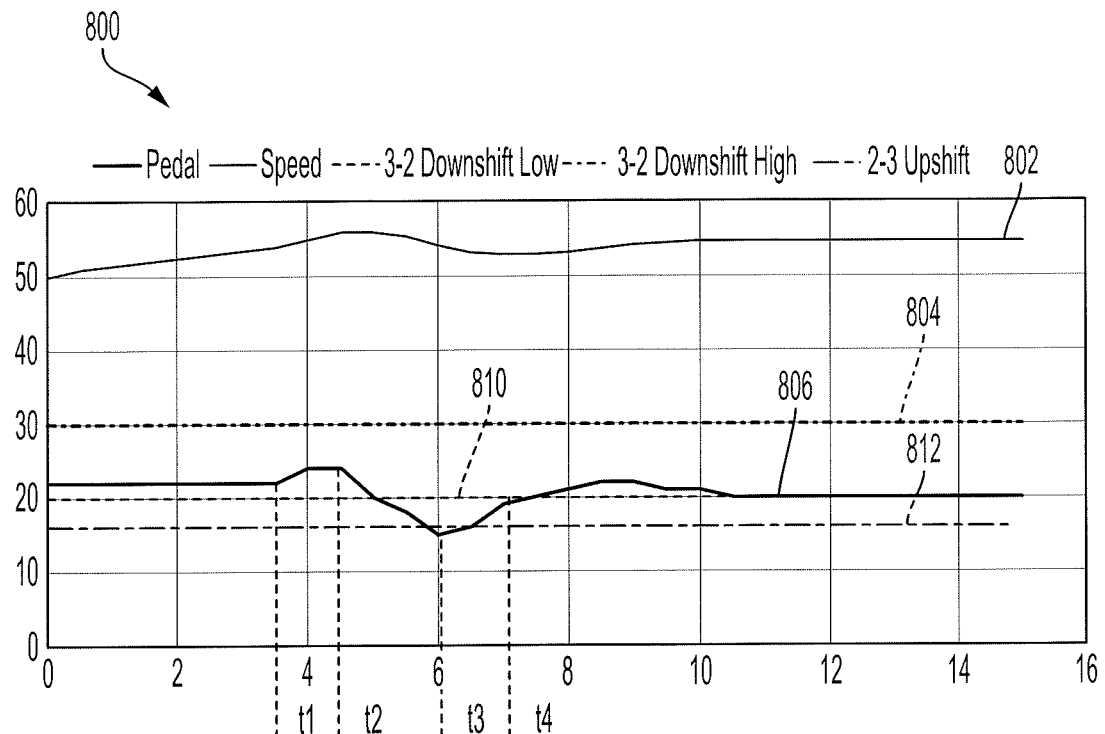
FIGS. 8A and 8B are timing diagrams of processes performed by the system, according to various embodiments of the invention.
Figure 8B:
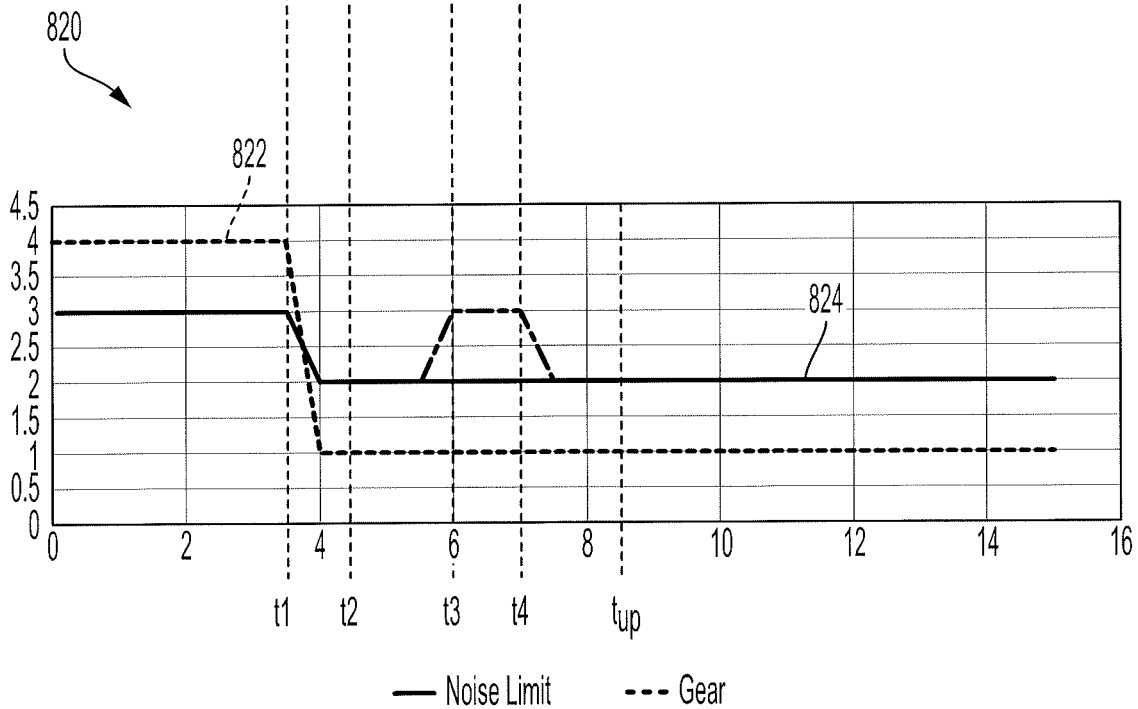

FIGS. 8A and 8B illustrate processes 400 and 600 in an example situation to demonstrate that using the upshift time threshold adds a time buffer when there is a state change to prevent frequent shifting. The upshift time threshold affords the driver time to find a steady pedal level without commanding unnecessary shifts.

FIG. 8A illustrates a graph 800 having time on the horizontal axis. The vehicle speed over time is shown by vehicle speed line 802. A high-noise downshift line 804, a low-noise downshift line 810, an upshift line 812, and a pedal engagement line 806 are also illustrated. The pedal engagement line 806 shows a pedal engagement over time. In this regard, the vehicle speed line 802 has a different unit (e.g., mph) on the vertical axis than the high-noise downshift line 804, the low-noise downshift line 810, the upshift line 812, and the pedal engagement line 806 (e.g., accelerator pedal engagement percentage).

FIG. 8B illustrates a graph 820 also having time on the horizontal axis. The graph 820 includes a detected noise line 822 corresponding to a noise level detected within the passenger cabin of the vehicle, over time. The graph 820 also includes a gear line 824 corresponding to a gear in use by the transmission. With respect to the vertical axis of graph 820, the detected noise line 822 may have a different unit than the gear line 824.

With respect to both FIGS. 8A and 8B, from time $t_0$ to $t_1$, there is a constant pedal engagement, shown by pedal engagement line 806, which leads to a steady increase in vehicle speed, shown by vehicle speed line 802. In addition, there is a high noise state, shown by detected noise line 822. As a result of the high noise state, the high-noise downshift line 804 is used, and the pedal engagement is below the high-noise downshift line 804, which allows the vehicle to stay in the 3rd gear, as shown by the gear line 824.

At time $t_1$, the noise level changes from a high noise state to a low noise state (step 402). Accordingly, the low noise line 810 will now be compared to the pedal engagement line 806 to determine whether to downshift. According to step 404 of process 400, when the pedal engagement change rate is a positive value and the vehicle is operating in an area above the current downshift line, a downshift should occur. Indeed, at $t_1$, the vehicle is operating above the low noise line 810 and the pedal engagement change rate is a positive value, so the transmission downshifts from the 3rd gear to the 2nd gear, as shown in gear line 824.

A timer is started (step 604) in response to the change to the lower torque limitation and the downshift. From time $t_2$ to $t_3$, the pedal engagement falls until the pedal engagement line 806 falls below the upshift line 812. Then, the pedal engagement increases and exceeds the upshift line 812.

The timer may be compared to an upshift time threshold, as shown in process 600. In this example, the upshift time threshold may be 5 seconds. Therefore, any upshifting prior to the elapsing of 5 seconds after the downshift is suppressed. The downshift occurred at $t_1$ (3.5 seconds), so any upshift will be suppressed until the 8.5 seconds mark on the horizontal axis, denoted by $t_{UP}$.

The upshift line 812 was crossed at time $t_3$. However, the $t_{UP}$ time threshold had not been reached. As a result, the gear stays in the 2nd gear.

A dashed line of the gear line 824 is also shown, which illustrates what would have happened if process 600 were not used. An upshift would have occurred at $t_3$ due to the pedal engagement line 806 crossing the upshift line 812. Then, at $t_4$, when the pedal engagement line 806 crosses the low-noise downshift line 810, the gear would have downshifted from the 3rd gear to the 2nd gear. In the dashed line scenario, the transmission would have oscillated between the 2nd gear and the 3rd gear three times in a span of 3.5 seconds, which would have been unexpected and uncomfortable for the driver and/or occupants. Instead, due to implementation of process 600, the driver and/or occupants did not experience the unexpected and uncomfortable oscillation between gears.

Figure 9:
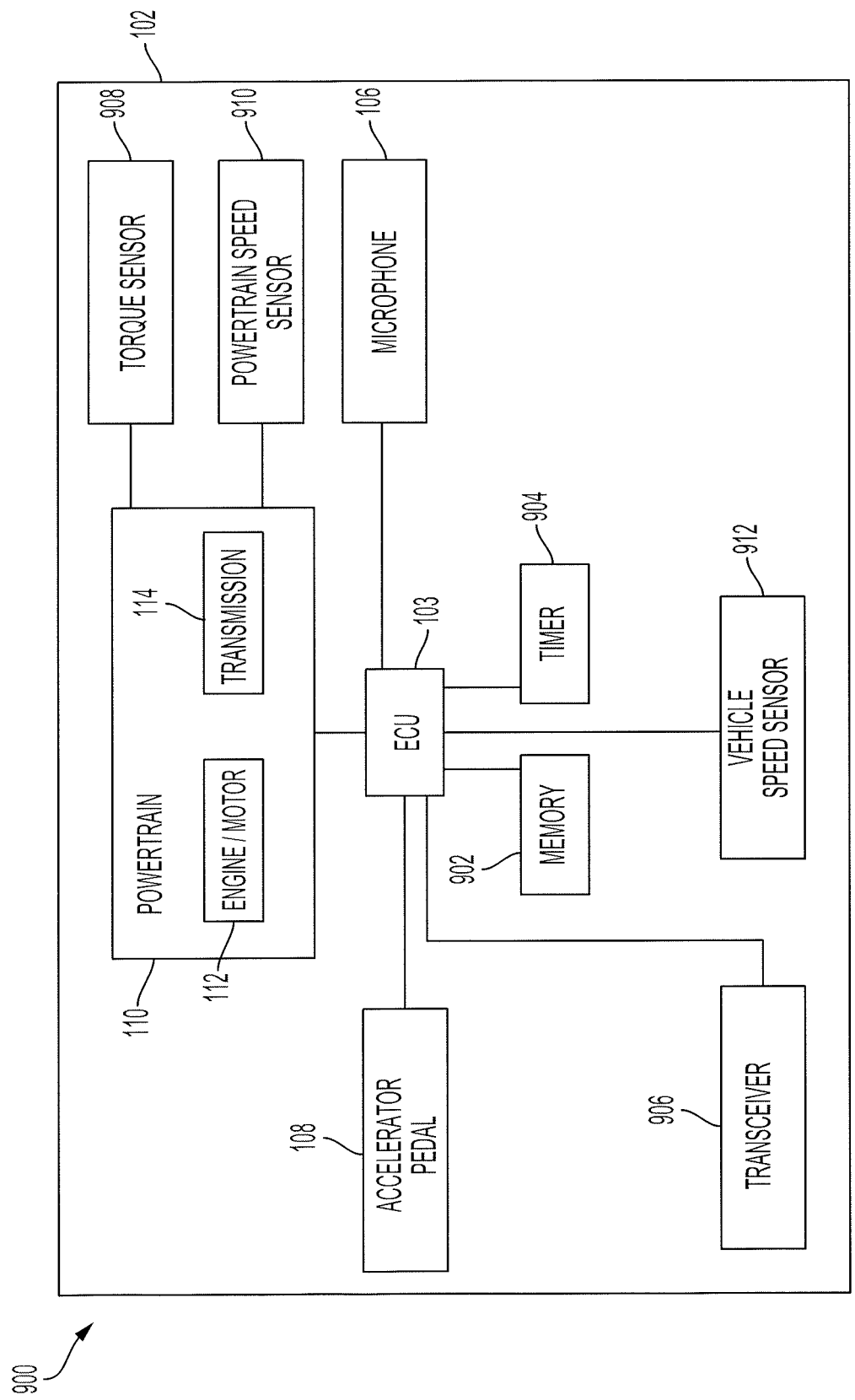
FIG. 9 is a block diagram of the system, according to various embodiments of the invention.

FIG. 9 illustrates an example system 900, according to various embodiments of the invention. The system may include a vehicle 102, as described herein. The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, trains, planes, or boats, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 also includes one or more computers or electronic control units (ECUs) 103, appropriately programmed, to control one or more operations of the vehicle 102. The one or more ECUs 103 may be implemented as a single ECU or in multiple ECUs. The ECU 103 may be electrically coupled to some or all of the components of the vehicle 102. In some embodiments, the ECU 103 is a central ECU configured to control one or more operations of the entire vehicle. In some embodiments, the ECU 103 is multiple ECUs located within the vehicle and each configured to control one or more local operations of the vehicle. In some embodiments, the ECU 103 is one or more computer processors or controllers configured to execute instructions stored in a non-transitory memory 902.

Although FIG. 9 illustrates various elements connected to the ECU 103, the elements of the vehicle 102 may be connected to each other using a communications bus.

The vehicle 102 may be coupled to a network via a transceiver 906. The network, such as a local area network (LAN), a wide area network (WAN), a cellular network, a digital short-range communication (DSRC), the Internet, or a combination thereof, may connect the vehicle 102 to a remote data server and/or a mobile device.

The transceiver 906 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 906 may transmit data to and receive data from devices and systems not directly connected to the vehicle.

The memory 902 is connected to the ECU 103 and may be connected to any other component of the vehicle 102. The memory 902 is configured to store any data described herein, such as a torque limit map (e.g., torque limit map 300), a downshift timer map, a downshift shift schedule, an upshift timer map, and any data received via the transceiver 906.

The vehicle 102 also includes a powertrain 110, which includes an engine/motor 112 and a transmission 114, each as described herein. The engine/motor 112 is configured to generate power for propelling the vehicle 102 and the transmission 114 is configured to regulate use of gears for utilizing the power generated from the engine/motor 112.

The vehicle 102 also includes an accelerator pedal 108 and a microphone 106, each as described herein. The accelerator pedal 108 is configured to receive an input from the driver, which is communicated to the ECU 103. The microphone 106 is configured to detect sound data from within the passenger cabin of the vehicle 102, which is communicated to the ECU 103. The ECU 103 may adjust operations of the powertrain 110 based on engagement of the accelerator pedal 108 and sound data detected by the microphone 106.

The ECU 103 may refer to a torque limit map (e.g., torque limit map 300) when determining a torque output limit based on the powertrain speed. When the torque output limit is reached, the ECU 103 instructs the transmission 114 to use a lower gear. The vehicle 102 also includes a torque sensor 908 configured to detect torque data indicating a current torque output from the engine/motor 112. The vehicle 102 also includes a powertrain speed sensor 910 configured to detect powertrain speed data indicating a current operating speed of the engine/motor 112. The torque sensor 908 may be part of the powertrain 110 or coupled to the powertrain 110. Similarly, the powertrain speed sensor 910 may be part of the powertrain 110 or coupled to the powertrain 110.

Which torque limit curve (e.g., no-noise curve 304, low-noise curve 306, mid-noise curve 308, high-noise curve 310) is used by the ECU 103 depends on a state of the vehicle 102 as determined using a state machine (e.g., state machine 200). Each torque limit curve may correspond to a different state of the state machine. The state machine may be implemented using hardware devices and/or software. The ECU 103 and the memory 902 may be used to maintain the current state and to determine a next state to transition to, as described herein.

In order to reduce abrupt switching between states and their associated torque limit curves, various timers may be used, as described herein. The timers may be implemented using the timer 904. The timer 904 is configured to determine an elapsed time. The timer 904 may be implemented in hardware or software. In some embodiments, the timer 904 is a part of the ECU 103.

The vehicle 102 may also include a vehicle speed sensor 912 configured to detect vehicle speed data indicating a travelling speed of the vehicle 102. The vehicle speed data may be used to control operations of the vehicle 102 including downshifting based on a downshift schedule (e.g., expanded downshift schedule 500) as described herein.

As used herein, a "unit" may refer to hardware components, such as one or more computer processors, controllers, or computing devices configured to execute instructions stored in a non-transitory memory.

Where the vehicle is described as making a determination or otherwise performing an action, the ECU 103 of the vehicle 102 may make the determination or coordinate performance of the action.

Figure 10:
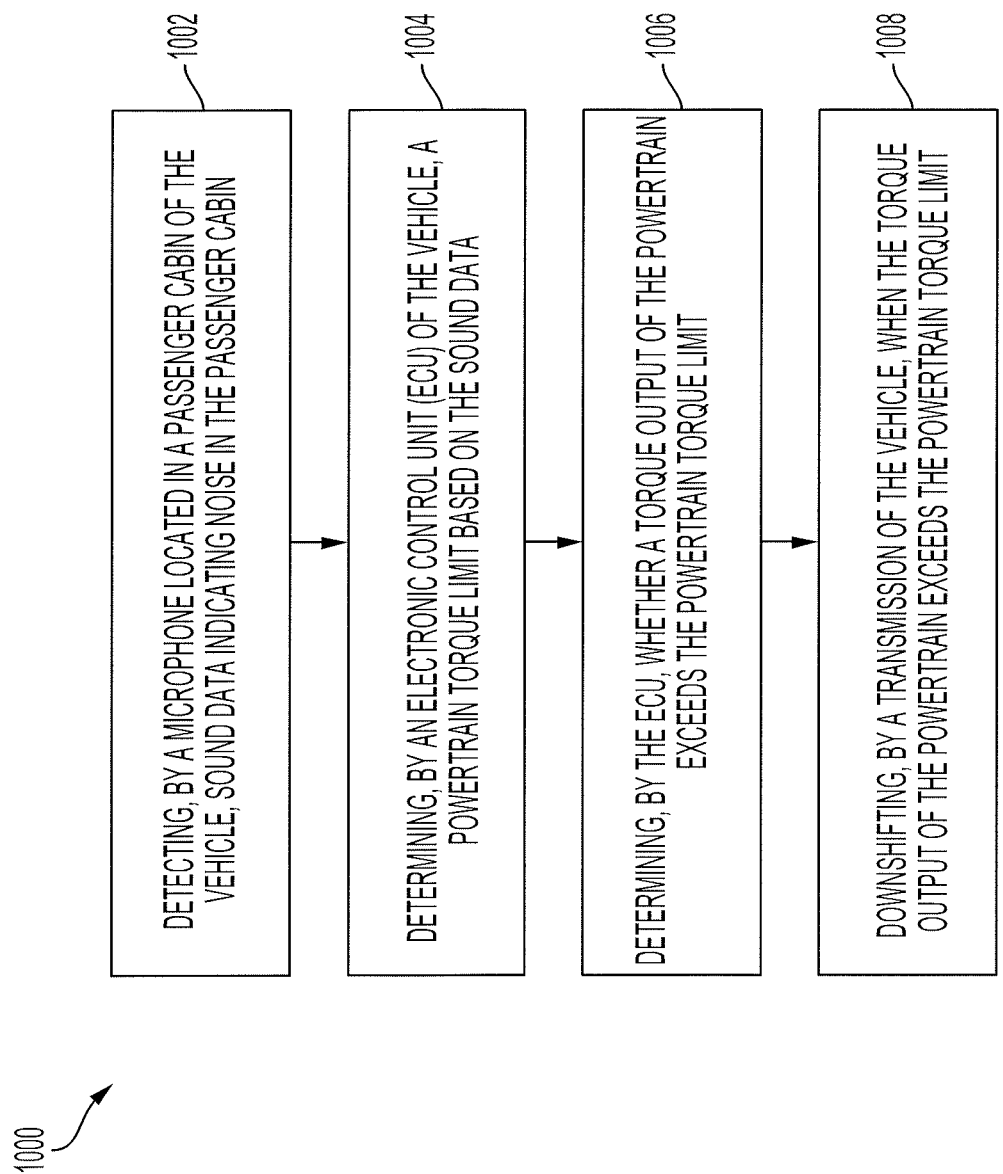
FIG. 10 is a flow diagram of a process performed by the system, according to various embodiments of the invention.

FIG. 10 illustrates a flowchart of a process 1000 performed by the systems described herein.

A microphone (e.g., microphone 106) detects sound data indicating noise in the passenger cabin of the vehicle (e.g., vehicle 102) (step 1002). An electronic control unit (ECU) (e.g., ECU 103) coupled to the microphone determines a powertrain torque limit based on the sound data (step 1004). As described herein, when the powertrain torque limit is exceeded, the ECU instructs a transmission (e.g., transmission 114) to downshift to a lower gear in order to avoid noise-related discomfort to the occupants of the vehicle.

In order to determine the powertrain torque limit, the ECU may determine a state from a plurality of states (e.g., states 204-210) based on the sound data, where each state is associated with a noise range. Each state may also correspond to a powertrain torque limit (e.g., curves 304-310) of a torque limit map (e.g., torque limit map 300). As described herein, a louder detected noise level within the vehicle allows for increased torque output.

The ECU determines whether a torque output of the powertrain exceeds the powertrain torque limit (step 1006). A torque sensor (e.g., torque sensor 908) may be used to determine the powertrain torque output at a given time.

When the torque output of the powertrain exceeds the powertrain torque limit, the ECU instructs the transmission to downshift, and the transmission downshifts to a lower gear (step 1008).

As shown and described with respect to FIG. 4, the ECU may determine whether an accelerator pedal engagement is increasing (step 404 of FIG. 4) and the ECU may instruct the transmission to downshift when the torque output of the powertrain exceeds the powertrain torque limit and when the accelerator pedal engagement is increasing (step 408 of FIG. 4).

Also as shown and described with respect to FIG. 4, the ECU may use a timer (e.g., timer 904) to determine an elapsed time since the powertrain torque limit was exceeded. The ECU may determine whether this elapsed time exceeds a downshift time threshold (step 410 of FIG. 4). The ECU may instruct the transmission to downshift when the torque output of the powertrain exceeds the powertrain torque limit and when the elapsed time since the powertrain torque limit was exceeded, exceeds the downshift time threshold.

As shown and described with respect to FIG. 6, the ECU may determine an elapsed time since the transmission downshifted in response to the instruction to downshift from the ECU. The ECU may determine whether this elapsed time exceeds an upshift time threshold, and the ECU may instruct the transmission to upshift to a higher gear based on an accelerator pedal engagement and whether the elapsed time since the transmission downshifted in response to the instruction to downshift from the ECU, exceeds the upshift time threshold.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents. Features across various embodiments described herein may be combined.

What is claimed is:

1. A system for controlling operation of a vehicle, the system comprising:
    a microphone located in a passenger cabin within the vehicle and configured to detect sound data indicating a current noise level in the passenger cabin;
    a powertrain including a propulsion source for propelling the vehicle and a transmission having a plurality of gears; and
    an electronic control unit (ECU) coupled to the microphone and the powertrain and configured to:
        determine a powertrain torque limit based on the sound data,
        determine the current noise level in the passenger cabin based on the sound data,
        adjust the powertrain torque limit based on the current noise level in the passenger cabin,
        determine whether a torque output of the powertrain exceeds the adjusted powertrain torque limit, and
        instruct the transmission to downshift when the torque output of the powertrain exceeds the adjusted powertrain torque limit.

2. The system of claim 1, wherein the ECU is further configured to determine or adjust the powertrain torque limit by determining a noise state based on the sound data and determining the powertrain torque limit corresponding to the noise state.

3. The system of claim 2, wherein the noise state is one of a plurality of noise states each having a respective sound threshold, and wherein the powertrain torque limit is one of a plurality of powertrain torque limits corresponding to the plurality of noise states.

4. The system of claim 1, wherein the ECU is further configured to determine whether an accelerator pedal engagement is increasing, and
    wherein the ECU is configured to instruct the transmission to downshift when the torque output of the powertrain exceeds the adjusted powertrain torque limit and when the accelerator pedal engagement is increasing.

5. The system of claim 1, wherein the ECU is further configured to determine whether an elapsed time since the adjusted powertrain torque limit was exceeded exceeds a downshift time threshold, and
    wherein the ECU is configured to instruct the transmission to downshift when the torque output of the powertrain exceeds the adjusted powertrain torque limit and when the elapsed time since the adjusted powertrain torque limit was exceeded exceeds the downshift time threshold.

6. The system of claim 5, wherein the ECU is further configured to determine the downshift time threshold based on a vehicle acceleration using a downshift timer map.

7. The system of claim 1, wherein the ECU is further configured to:
    determine whether an elapsed time since the transmission downshifted in response to the instruction to downshift from the ECU exceeds an upshift time threshold, and
    instruct the transmission to upshift based on an accelerator pedal engagement and the determination of whether the elapsed time since the transmission downshifted in response to the instruction to downshift from the ECU exceeds the upshift time threshold.

8. The system of claim 7, wherein the ECU is further configured to determine the upshift time threshold based on the accelerator pedal engagement and a powertrain speed using an upshift timer map.

9. A method for controlling operation of a vehicle, the method comprising:

detecting, by a microphone located in a passenger cabin within the vehicle, sound data indicating a current noise level in the passenger cabin;

determining, by an electronic control unit (ECU) coupled to the microphone and a powertrain including a transmission, a powertrain torque limit based on the sound data;

determining, by the ECU, the current noise level in the passenger cabin based on the sound data;

adjusting, by the ECU, the powertrain torque limit based on the current noise level in the passenger cabin;

determining, by the ECU, whether a torque output of the powertrain exceeds the adjusted powertrain torque limit; and downshifting, by the transmission, in response to the torque output of the powertrain exceeding the adjusted powertrain torque limit.

10. The method of claim 9, wherein determining or adjusting the powertrain torque limit includes determining a noise state based on the sound data and determining the powertrain torque limit corresponding to the noise state.

11. The method of claim 10, wherein the noise state is one of a plurality of noise states each having a respective sound threshold, and wherein the powertrain torque limit is one of a plurality of powertrain torque limits corresponding to the plurality of noise states.

12. The method of claim 9, further comprising determining, by the ECU, whether an accelerator pedal engagement is increasing, and
wherein the downshifting includes downshifting in response to the torque output of the powertrain exceeding the adjusted powertrain torque limit and the accelerator pedal engagement increasing.

13. The method of claim 9, further comprising determining, by the ECU, whether an elapsed time since the adjusted powertrain torque limit was exceeded exceeds a downshift time threshold, and
wherein the downshifting includes downshifting in response to the torque output of the powertrain exceeding the adjusted powertrain torque limit and the elapsed time since the adjusted powertrain torque limit was exceeded exceeding the downshift time threshold.

14. The method of claim 13, further comprising determining, by the ECU, the downshift time threshold based on a vehicle acceleration using a downshift timer map.

15. The method of claim 9, further comprising:
determining, by the ECU, whether an elapsed time since the downshifting exceeds an upshift time threshold; and
upshifting, by the transmission, in response to an accelerator pedal engagement and the elapsed time since the downshifting exceeding the upshift time threshold.

16. The method of claim 15, further comprising determining, by the ECU, the upshift time threshold based on the accelerator pedal engagement and a powertrain speed using an upshift timer map.

17. A vehicle comprising:
a microphone located in a passenger cabin and configured to detect sound data indicating a current noise level in the passenger cabin;
a powertrain including a propulsion source for propelling the vehicle and a transmission having a plurality of gears; and
an electronic control unit (ECU) coupled to the microphone and the powertrain and configured to:
determine a powertrain torque limit based on the sound data,
determine the current noise level in the passenger cabin based on the sound data,
adjust the powertrain torque limit based on the current noise level in the passenger cabin,
determine whether a torque output of the powertrain exceeds the adjusted powertrain torque limit, and
instruct the transmission to downshift when the torque output of the powertrain exceeds the adjusted powertrain torque limit.

18. The vehicle of claim 17, wherein the ECU is further configured to determine or adjust the powertrain torque limit by determining a noise state based on the sound data and determining the powertrain torque limit corresponding to the noise state.

19. The vehicle of claim 17, wherein the ECU is further configured to:
determine whether an accelerator pedal engagement is increasing, and
determine whether an elapsed time since the adjusted powertrain torque limit was exceeded exceeds a downshift time threshold,
wherein the ECU is configured to instruct the transmission to downshift (i) when the torque output of the powertrain exceeds the adjusted powertrain torque limit and when the accelerator pedal engagement is increasing, or (ii) when the torque output of the powertrain exceeds the adjusted powertrain torque limit and when the elapsed time since the adjusted powertrain torque limit was exceeded exceeds the downshift time threshold.

20. The vehicle of claim 17, wherein the ECU is further configured to:
determine whether an elapsed time since the transmission downshifted in response to the instruction to downshift from the ECU exceeds an upshift time threshold, and
instruct the transmission to upshift based on an accelerator pedal engagement and the determination of whether the elapsed time since the transmission downshifted in response to the instruction to downshift from the ECU exceeds the upshift time threshold.

\* \* \* \* \*